(12) United States Patent
Keay

(10) Patent No.: US 10,413,125 B2
(45) Date of Patent: Sep. 17, 2019

(54) COOKING OIL FILTRATION SYSTEMS AND METHODS

(71) Applicant: Clarification Technology, Inc., Kirkland, WA (US)

(72) Inventor: Peter Keay, Port Jervis, NY (US)

(73) Assignee: CLARIFICATION TECHNOLOGY, INC., Kirkland, WA (US)

( * ) Notice: Subject to any disclaimer, the term of this patent is extended or adjusted under 35 U.S.C. 154(b) by 107 days.

(21) Appl. No.: 15/512,396

(22) PCT Filed: Sep. 18, 2015

(86) PCT No.: PCT/US2015/051073
§ 371 (c)(1),
(2) Date: Mar. 17, 2017

(87) PCT Pub. No.: WO2016/044800
PCT Pub. Date: Mar. 24, 2016

(65) Prior Publication Data
US 2017/0245685 A1 Aug. 31, 2017

Related U.S. Application Data

(60) Provisional application No. 62/052,992, filed on Sep. 19, 2014.

(51) Int. Cl.
*A47J 37/12* (2006.01)

(52) U.S. Cl.
CPC ....... *A47J 37/1223* (2013.01); *A47J 37/1271* (2013.01)

(58) Field of Classification Search
CPC ........ B01D 29/27; B01D 29/88; B01D 36/00; A47J 37/1223; A47J 37/1271
See application file for complete search history.

(56) References Cited

U.S. PATENT DOCUMENTS

| 2,448,157 A | 8/1948 | Schneider |
| 2,515,538 A | 7/1950 | Wall |

(Continued)

FOREIGN PATENT DOCUMENTS

| DE | 200 23 240 U1 | 7/2003 |
| DE | 10 2006 001 486 A1 | 7/2007 |

(Continued)

*Primary Examiner* — Jason M Greene
(74) *Attorney, Agent, or Firm* — Seed Intellectual Property Law Group LLP

(57) ABSTRACT

A used cooking oil filtration system (100) includes a housing (102) defining an interior space (104), a gas source (130), a gas inlet (134) fluidly coupled to the gas source (130) to permit the introduction of a gas to the interior space (104) of the housing (102). The housing (102) further includes a fluid inlet (108), a fluid outlet (114), and filter media (116) disposed proximate the fluid outlet (114). The housing (102) is at least partially immersed in used cooking oil (150) and gas pressure in the interior space is maintained at a first pressure level at which used cooking oil flows into the interior space. The gas source (130) increases the gas pressure in the interior space to a second pressure level at which the used cooking oil flows through the filter media and exits the housing (102) through the fluid outlet (114). Flowing the used cooling oil through the filter media (116) reduces the concentration of one or more contaminants present at a first contaminant level in the used cooking oil to a second contaminant level.

26 Claims, 8 Drawing Sheets

(56) References Cited

U.S. PATENT DOCUMENTS

| | | | |
|---|---|---|---|
| 3,172,850 A | | 3/1965 | Englesberg et al. |
| 3,356,218 A | | 12/1967 | Grudoski |
| 3,415,181 A | | 12/1968 | Hart |
| 3,447,685 A | | 6/1969 | Bircher |
| 3,507,392 A | | 4/1970 | Alexander et al. |
| 3,630,373 A | | 12/1971 | Grazen |
| 3,886,616 A | | 6/1975 | Hayes |
| 4,068,571 A | | 1/1978 | Cunningham |
| 4,301,005 A | | 11/1981 | Schön et al. |
| 4,618,425 A | | 10/1986 | Yates |
| 4,642,184 A | | 2/1987 | Liepse |
| 4,880,652 A | * | 11/1989 | Regutti ............... A47J 37/1223 426/417 |
| 4,988,440 A | | 1/1991 | Bernard et al. |
| 5,021,151 A | | 6/1991 | Yane |
| 5,160,444 A | | 11/1992 | McFarland |
| 5,766,464 A | | 6/1998 | Campbell |
| 5,951,854 A | | 9/1999 | Goldberg et al. |
| 7,052,605 B2 | | 5/2006 | Posavac et al. |
| 8,454,827 B1 | * | 6/2013 | Cazzoli ............... A47J 37/1271 210/167.28 |
| 2007/0289927 A1 | * | 12/2007 | Bivens ................ A47J 37/1223 210/767 |
| 2009/0101023 A1 | * | 4/2009 | Kimura ............... A47J 37/1223 99/331 |
| 2011/0062091 A1 | * | 3/2011 | Peters .................... B01D 29/27 210/808 |

FOREIGN PATENT DOCUMENTS

| | | |
|---|---|---|
| JP | 62-14824 A | 1/1987 |
| WO | 02/28505 A1 | 4/2002 |
| WO | 2009/131283 A1 | 10/2009 |

\* cited by examiner

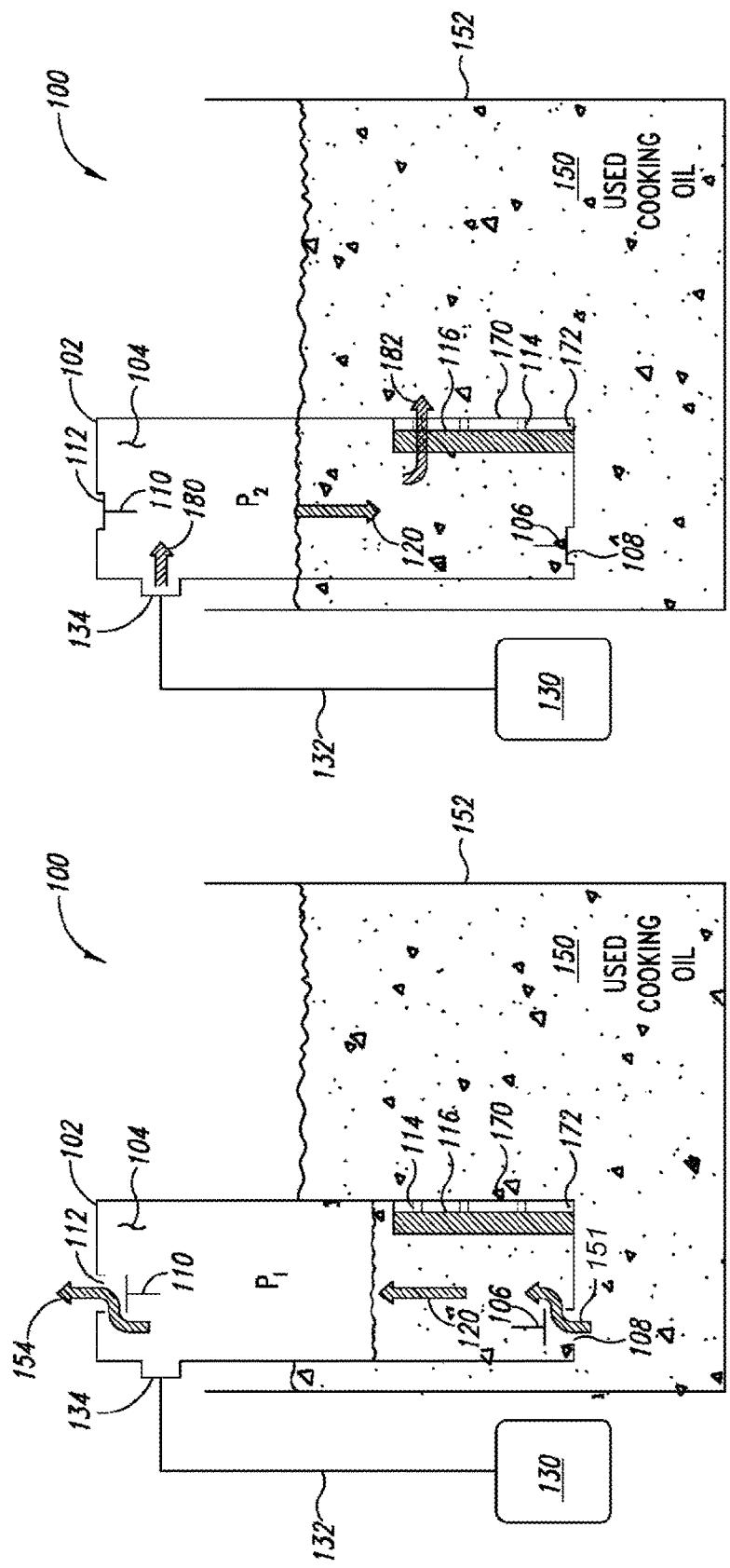

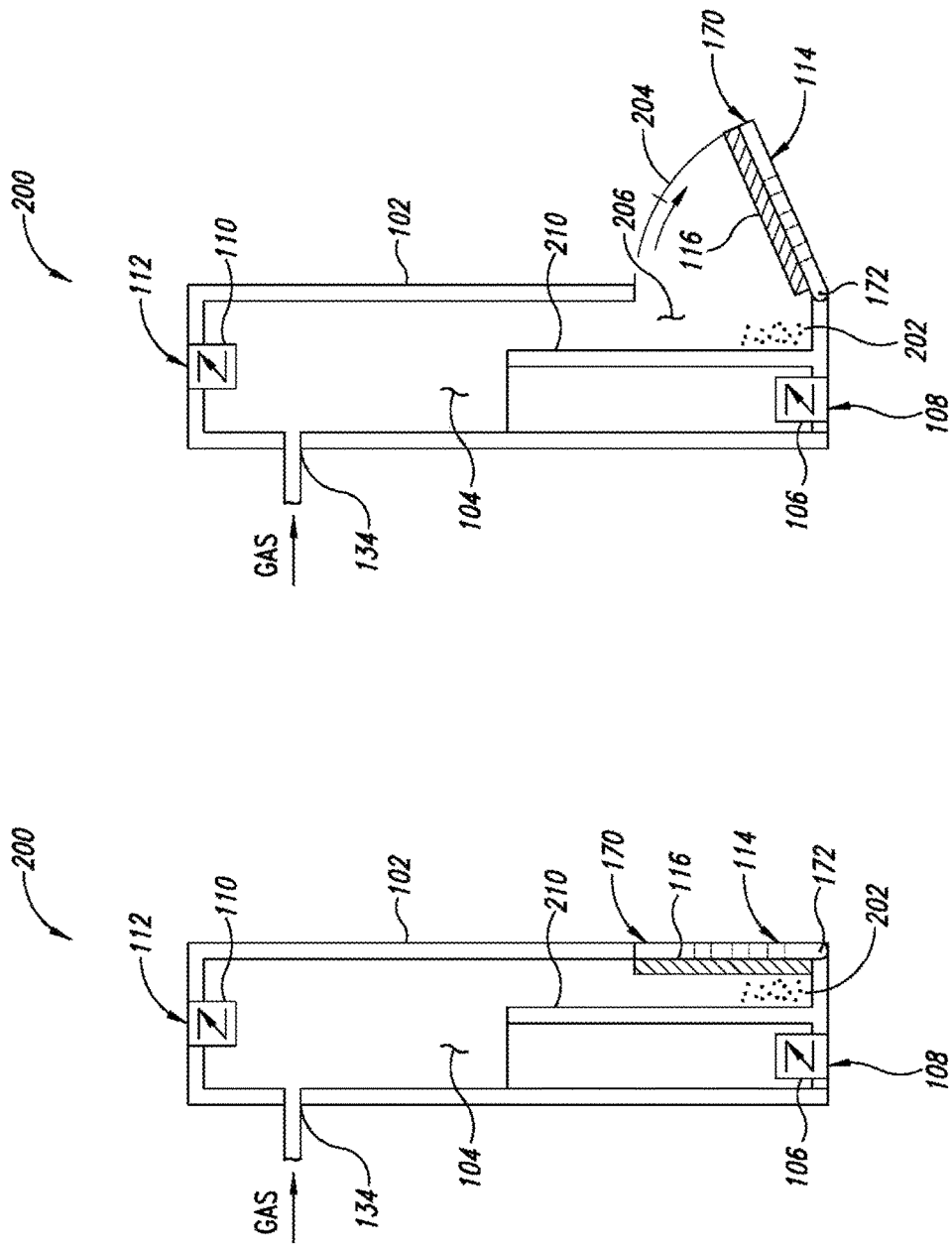

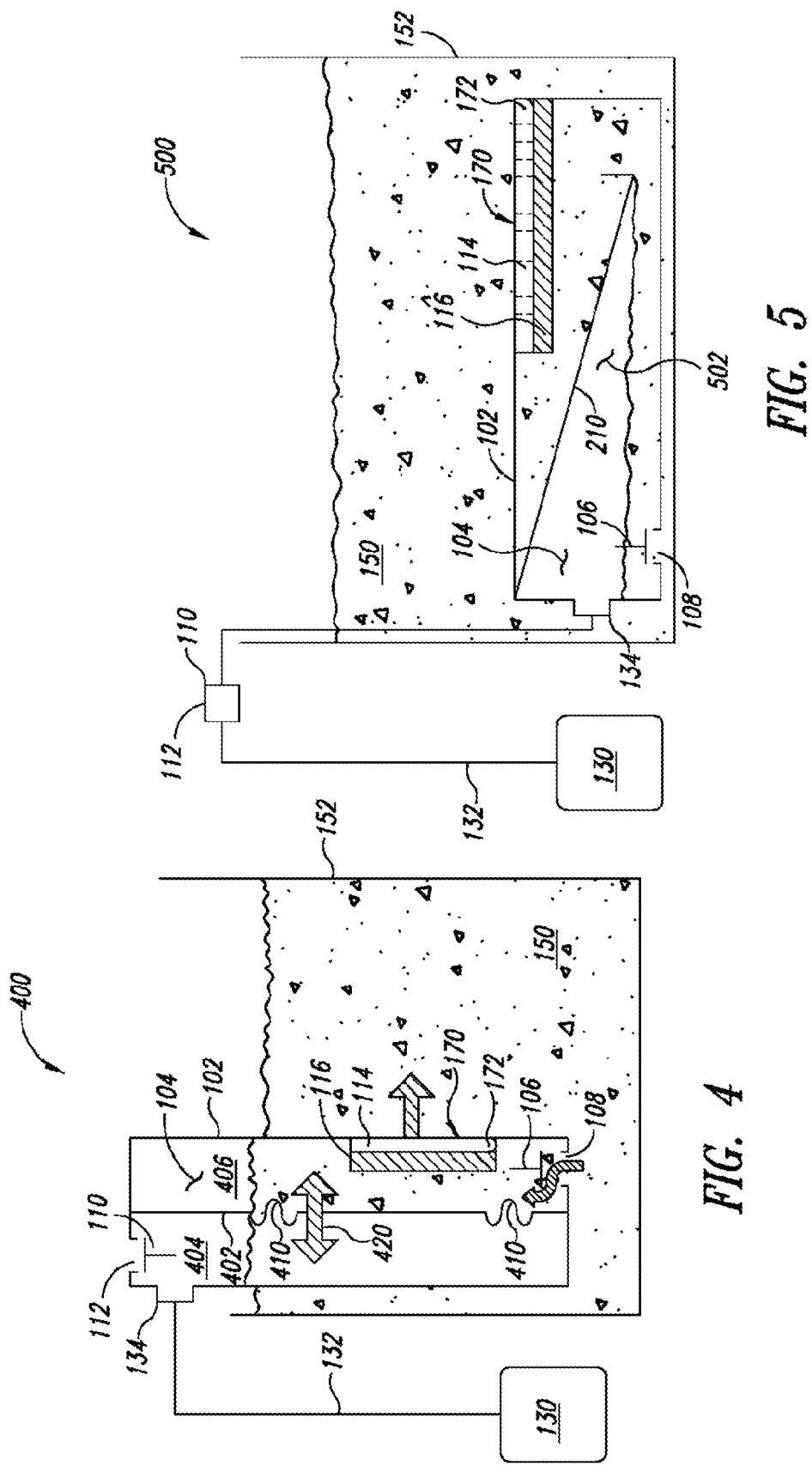

COOKING OIL FILTRATION SYSTEMS AND METHODS

BACKGROUND

Technical Field

The present disclosure generally relates to a cooking oil filtration systems.

Description of the Related Art

Cooking oils, such as those used in commercial or industrial deep fryers, tend to become contaminated with moisture, carbonized food particles, and the like during the frying process. Additionally cooking oils tend to detrimentally degrade or oxidize as water and other contaminants such as metal ions solubilize in the cooking oil. Such contaminants may be introduced by the food cooked in the oil or even from the surfaces of the deep fryer itself. Additionally, the oils themselves tend to break down chemically after extended use.

Left untreated, such used cooking oil will generally have unacceptably high concentrations of contaminants and chemical breakdown byproducts. These contaminants and chemical breakdown byproducts often have undesirable characteristics such as causing the oil to foam, smoke, smell bad, possess an unsightly appearance, and/or impart a bad taste to the fried food. It has been found that keeping the cooking oil clean by removing the particulate matter and filtering it on a regular basis tends to extend the useful life of the cooking oil and increase the quality and appearance of foods which are cooked therein.

Previous cooking oil filter media include wire mesh strainers, coarse paper, and diatomaceous earth or similar filtering material. Wire mesh strainers are restricted to the removal of large particulate matter. Conventional coarse paper filters (having a pore size of from 4 to 80 microns with a mean pore size on the order of 10 microns) exhibits only moderate filtering effectiveness. Diatomaceous earth and similar filtering materials usually exist in a loose form that is messy and awkward to handle.

Other known cooking oil filter media include filter sheet or filter pad media having a substantially planar form and which combine various filtration mechanisms over a depth of the sheet or pad to filter cooking oil in a particularly efficient manner. The filters described in U.S. Pat. No. 4,988,440, the entire content of which is incorporated herein by reference in its entirety, provide examples of such filter media. Other examples of filter pad devices which are particularly effective in filtering cooking oil are marketed by Clarification Technology, Inc. of Kirkland, Wash. under the trademark SuperSorb®.

Traditional filter pads and similar devices frequently require operating personnel to drain or otherwise remove the used cooking oil from the deep fryer for treatment and/or filtration prior to returning the filtered cooking oil to the deep fryer. Removing the used cooking oil from the deep fryer, filtering the cooking oil through an external filtration system or device to provide a filtered cooking oil, and returning the filtered cooking oil to the deep fryer require operating personnel to handle the oil on multiple occasions, increasing the chance of a spill or injury.

BRIEF SUMMARY

The Applicants have developed a cooking oil filtration system that may be used in-situ within a deep fryer thereby eliminating the need for removing the used cooking oil from the deep fryer for filtration or treatment. Further, the instant cooking oil filtration system is also useable in any type of used cooking oil reservoir, including used cooking oil storage drums, cans, buckets, or the like.

The instant used cooking oil filtration system employs a filter system that includes a housing having a gas inlet, gas outlet, fluid inlet, and fluid outlet. A filter media, for example a filter pad media such as a SuperSorb® filter pad is disposed inside the housing, proximate the fluid outlet. A gas supply couples to the gas inlet on the housing. The filter system is at least partially immersed in a used cooking oil reservoir and an interior space within the housing at least partially fills with the used cooking oil. A gas is introduced to the housing, increasing the pressure in the housing from a first pressure level to a second pressure level that is greater than the first pressure level. As the gas pressure increases to the second pressure level within the housing the used cooking oil in the housing is displaced outward through the filter media and exits the housing via the fluid outlet.

After reaching the second pressure level, the gas pressure in the filter housing can be reduced back to the first pressure level. As the pressure is reduced to the first pressure level, used cooking oil once again flows into the interior space of the filter housing. The ongoing cycling of the gas pressure in the filter housing from the first pressure level to the second pressure level and from the second pressure level back to the first pressure level is repeated until the used cooking oil is once again of a quality suitable for food preparation. Upon removing the contamination from the used cooking oil present in the cooking oil reservoir, the filter system may be removed from the reservoir for cleaning.

The filter housing includes an interior space. A fluid inlet valve is disposed proximate the fluid inlet. The fluid inlet valve permits the used cooking oil to flow into the interior space of the housing as the gas pressure in the interior space of the housing is reduced from the second pressure level to the first pressure level. The fluid inlet valve prevents the used cooking oil from flowing into the interior space of the housing when the gas pressure in the interior space is increased, for example as the gas pressure in the interior space of the housing is increased from the first pressure level to the second pressure level. At least a portion of the housing may be displaceable, hinged, or otherwise removable to provide access to at least a portion of the interior of the housing. The fluid outlet may be disposed on at least a portion of such a hinged portion of the housing. Disposing the fluid outlet on the hinged portion of the housing advantageously provides convenient access to the filter media and also advantageously provides convenient access to clean out the areas proximate the filter media where the solids removed from the used cooking oil accumulate.

A gas inlet permits the flow of gas from a gas source into the interior space of the filter housing. A gas source such as an air pump or air compressor fluidly couples to the gas inlet. At least one gas valve may be fluidly coupled to the filter housing or fluidly coupled to a fluid conduit coupling the gas supply to the filter housing. The gas valve closes to prevent the gas introduced to the interior space of the housing from escaping while the gas pressure in the interior space is increased, for example as the gas pressure in the interior space of the housing is increased from the first pressure level to the second pressure level. The gas valve selectively opens to permit the gas introduced to the interior space of the housing to escape while the gas pressure in the interior space is decreased, for example as the gas pressure in the interior space of the housing is decreased from the second pressure level to the first pressure level.

Various features may be included in the interior space of the housing to assist in the separation of solids from the used cooking oil. As solids are filtered from the used cooking oil, the solids tend to accumulate in locations proximate the filter media. To limit the stirring and/or suspension of these solids, in some embodiments, a partition member or "chimney" may be installed between the fluid inlet and the fluid outlet to prevent the incoming used cooking oil from flowing through or past those areas where removed solids are expected to accumulate. In other embodiments, however, the housing may omit or exclude the partition member, as the cooking oil filtration system may operate without the partition member.

A gas pump, gas compressor, or compressed gas source provides the gas introduced to the interior space of the housing. The pump, compressor, or compressed gas source can supply a continuous flow of gas to the interior space of the housing, in which case the gas valve controls the gas pressure within the housing by selectively opening to release gas pressure and closing to build gas pressure. The pump, compressor, or compressed gas source can intermittently supply a flow of gas to the interior space of the housing (e.g., periodically, the pump, compressor, or compressed gas source can be halted, or stopped), in which case the gas valve controls the gas pressure within the housing by selectively opening to release gas pressure and closing to build gas pressure. The pump, compressor, or compressed gas source can intermittently supply a flow of gas to and intermittently evacuate the gas from the interior space of the housing.

A used cooking oil filter system includes a housing defining an interior space; at least one compressed gas source fluidly coupled to the interior space of the housing that, in operation, intermittently introduces a compressed gas to the interior space of the housing to increase a pressure in the interior space of the housing from a first pressure level to a second pressure level, the second pressure level higher than the first pressure level; at least one gas outlet; at least one gas flow valve fluidly coupled to the at least one gas outlet; at least one fluid inlet; at least one fluid outlet; at least one filter element fluidly coupled to the at least one fluid outlet; and at least one fluid flow valve fluidly coupled to the at least one fluid inlet that in operation at the first pressure level, permits a fluid containing one or more contaminants at a first contaminant level to flow from an exterior space about the housing to at least a portion of the interior space of the housing; and in operation at the second pressure level, prevents the fluid containing the one or more contaminants at the first contaminant level within the interior space of the housing from flowing into the interior space of the housing and promotes flow of the fluid containing the one or more contaminants at the first contaminant level through at least a portion of the at least one filter element and the at least one fluid outlet.

The used cooking oil filter system may additionally include a partition member disposed within the interior space of the housing, the partition positioned between the at least one fluid inlet and the at least one fluid outlet. The partition member may be disposed within the interior space of the housing in a location that prevents a direct fluid flow path between the at least one fluid inlet and the at least one fluid outlet.

The used cooking oil filter system may additionally include at least one flexible diaphragm member disposed in the interior space of the housing, the at least one flexible diaphragm member partitioning the interior space of the housing into two, fluidly isolated, variable capacity, chambers. The two, fluidly-isolated, variable capacity chambers include a first, gas-side, chamber and a second, fluid-side, chamber; the compressed gas source and the at least one gas outlet are fluidly coupled to the first, gas-side, chamber; and the at least one fluid inlet, the at least one fluid filter element, and the at least one fluid outlet are fluidly coupled to the second, fluid-side, chamber.

The used cooking oil filter system housing may include a displaceable portion that includes the at least one fluid filter element positioned proximate at least one fluid outlet; the displaceable portion is continuously displaceable between a first position and a second position; and, in the first position, the displaceable portion forms a seal with the housing such that, in operation at the second pressure level, the fluid containing the one or more contaminants at the first contaminant level within the interior space of the housing flows through at least a portion of the fluid filter element and exits the interior space of the housing to the exterior space about the housing via the at least one fluid outlet. When in the second position, the displaceable portion provides direct access to the interior space of the housing. The displaceable portion may additionally include a retainer that maintains the hinged member in the first position. The retainer may include at least one protrusion on the displaceable portion and a detent in a location corresponding to the at least one protrusion when the displaceable portion is in the first position.

The used cooking oil filter system may include at least one gas outlet disposed remote from the housing and is fluidly coupled to the interior space of the housing via one or more hollow fluid conduits. The used cooking oil filter system may include at least one filter element that includes a carbonaceous material. The used cooking oil filter system may include a compressed gas source including an air compressor. The used cooking oil filter system may include a compressed gas source that includes an air pump. The used cooking oil filter system may include at least one filter element that includes a carbon-containing material that physically removes at least a portion of the one or more contaminants. The used cooking oil filter system may include at least one filter element that includes one or more compounds that chemically alter the composition of at least some of the one or more contaminants.

An in-situ method of removing at least a portion of one or more contaminants from a used cooking oil that includes one or more contaminants at a first contaminant level to provide a cooking oil that includes the one or more contaminants at a second contaminant level lower than the first contaminant level, the method includes intermittently increasing a gas pressure in an interior space of a housing disposed in an environment including a volume of the used cooking oil that includes the at least one contaminant at the first contaminant level, from a first pressure level to a second pressure level; closing a fluid flow valve proximate a fluid inlet to the interior space of the housing as the gas pressure increases from the first pressure level to the second pressure level, the closed fluid flow valve to obstruct a fluid flow path from the environment to the interior space of the housing; flowing the used cooking oil in the interior space of the housing through a filter element fluidly coupled to a fluid outlet as the gas pressure increases from the first pressure level to the second pressure level, to provide the cooking oil containing the one or more contaminants at the second contaminant level; expelling the cooking oil to the environment via the fluid outlet as the gas pressure increases from the first pressure level to the second pressure level; intermittently decreasing the gas pressure in the interior space of the housing from the second pressure level to the first pressure level; opening the fluid flow valve as the gas pressure decreases from the second pressure level to the first pressure level, the open fluid flow valve to clear the fluid flow path from the environment to the interior space of the housing; and flowing the used cooking oil from the ambient environment to the interior space of the housing via the flow path as the gas pressure decreases from the second pressure level to the first pressure level.

Intermittently increasing a gas pressure in an interior space of a housing from a first pressure level to a second pressure level can include: selectively introducing a gas from a compressed gas source fluidly coupled to the interior space of the housing via a gas inlet disposed on the housing; and selectively preventing the escape of the gas from the interior space of the housing via a gas valve fluidly coupled to the housing. Intermittently decreasing the gas pressure in an interior space of the housing from the second pressure level to the first pressure level may include selectively releasing the gas from the interior space of the housing via the gas valve fluidly coupled to the housing. Intermittently decreasing the gas pressure in an interior space of the housing from the second pressure level to the first pressure level may include selectively fluidly isolating the compressed gas source from the interior space of the housing. Selectively fluidly isolating the compressed gas source from the interior space of the housing may include selectively depowering at least one of an air compressor or an air pump fluidly coupled to the interior space of the housing.

Flowing the used cooking oil in the interior space of the housing through a filter element removably, directly, and fluidly coupled to a fluid outlet and expelling the cooking oil via the fluid outlet may include selectively introducing a gas to a first chamber disposed within at least a portion of the interior space of the housing, the first chamber separated from a second chamber containing the used cooking oil by a flexible diaphragm; and responsive to the introduction of the gas to the first chamber, increasing the gas pressure in the first chamber from the first pressure level to the second pressure level to increase an internal volume of the first chamber and decrease an internal volume of the second chamber.

Flowing, at the first pressure level, the used cooking oil from the ambient environment to the interior space of the housing may include selectively releasing the gas from the first chamber; and responsive to the release of gas from the first chamber reducing the gas pressure in the first chamber from the second pressure level to the first pressure level to decrease the internal volume of the first chamber and increase the internal volume of the second chamber.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1A is a sectional elevation view of an example cooking oil filtration system transitioning from a second internal gas pressure to a relatively lower first internal gas pressure, according to one non-limiting illustrated embodiment.

FIG. 1B is a sectional elevation view of an example cooking oil filtration system transitioning from the first internal gas pressure to a relatively higher second internal gas pressure, according to one non-limiting illustrated embodiment.

FIG. 2A is a sectional side elevation view of an example cooking oil filtration system that includes a hinged housing portion, with the hinged portion of the housing in a first, or closed, position (i.e., an operational position), according to one non-limiting illustrated embodiment.

FIG. 2B is a sectional side elevation view of an example cooking oil filtration system that includes a hinged housing portion, with the hinged portion of the housing in a second, or open, position (i.e., a maintenance or cleaning position), according to one non-limiting illustrated embodiment.

FIG. 4 is a sectional elevation view of another example cooking oil filtration system that includes a flexible diaphragm member, according to one non-limiting illustrated embodiment.

FIG. 5 is a sectional elevation view of another example cooking oil filtration system that includes a horizontal submersible housing, according to one non-limiting illustrated embodiment.

DETAILED DESCRIPTION

Figure 3A:
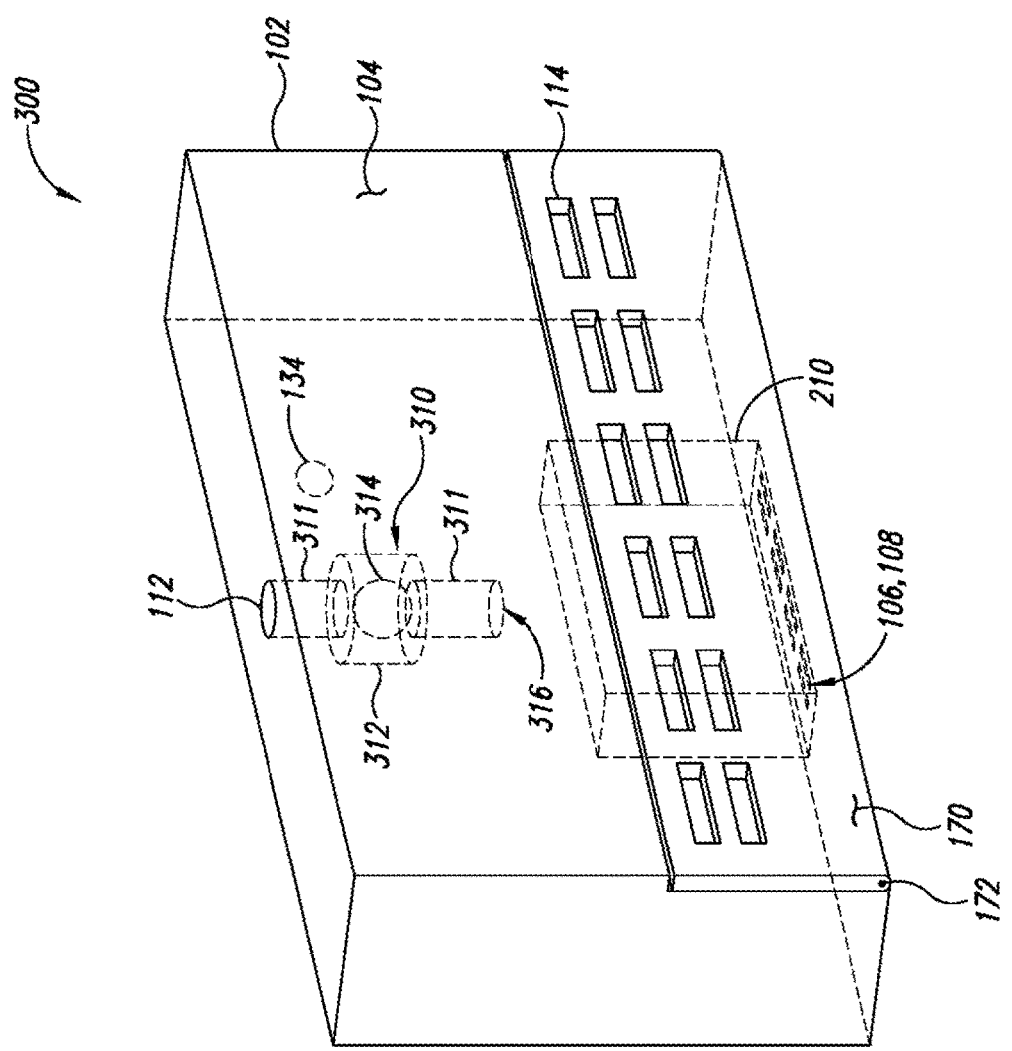
FIG. 3A is a perspective view of an example cooking oil filtration system that includes a hinged housing portion, with the hinged portion of the housing in a first, or closed, position (i.e., an operational position), according to one non-limiting illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with metal fabrication techniques, fasteners, welding, filter media, filter pads, gas compressors, gas pumps, compressed gas handling systems and the like have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to filter media means any current or future developed filter media capable of removing contaminants from oils such as used cooking oils. Such media may remove contaminants through physical trapping of the contaminants, chemical removal of contaminants through processes such as adsorption or absorption, or chemical alteration of one or more contaminant properties such as via ion exchange or replacement.

The headings and Abstract of the Disclosure provided herein are for convenience only and do not interpret the scope or meaning of the embodiments.

FIGS. 1A and 1B show an example cooking oil filtration system 100 that includes a housing 102 defining an interior space 104 and a gas source 130 that is fluidly coupled to the interior space 104 via one or more fluid conduits 132, according to one illustrated embodiment. The housing 102 is at least partially immersed in a reservoir 152 containing used cooking oil 150 that includes one or more contaminants at a first contaminant concentration. Though not illustrated, housing 102 may include or be associated with a supporting structure which allows the housing to hung or suspended from portions of the vessel containing the used cooking oil. Alternatively, though not illustrated, housing 102 may include or be associated with a supporting structure that acts a stand for housing 102 and may be placed within the vessel containing the used cooking oil.

In FIG. 1A, the interior space 104 of the housing 102 is maintained at a first pressure level $P_1$. Arrow 120 indicates the used cooking oil level in the interior space 104 of the housing 102 tends to increase when the gas pressure in the interior space 104 is at the first pressure level. At the first pressure level, one or more fluid inlet valves 106 permit the flow of used cooking oil 150 through one or more fluid inlets 108 into the interior space 104 of the housing 102 (denoted by arrow 151). Additionally, at the first pressure level, one or more gas outlet valves 110 permit the flow of gas in the interior space 104 of the housing 102 to flow through one or more gas outlets 112 to the ambient environment about the housing 102 (denoted by arrow 154). Although shown as disposed in the housing 102, the one or more gas valves 110 and the one or more gas outlets 112 may, at times, be disposed remote from the housing 102, for example the one or more gas valves 110 and the one or more gas outlets 112 may be fluidly coupled to the fluid conduit 132 at a location remote from the housing 102.

The housing 102 includes a displaceable portion 170 that provides access to at least some of the interior space 104 of the housing 102. In one implementation such as that depicted in FIGS. 1A and 1B, the displaceable portion 170 pivotably couples to the housing 102 via one or more hinges 172. In another implementation, the displaceable portion 170 may detachably attach to the housing 102 using a number of removable fasteners (e.g., threaded fasteners such as screws, bolts, or similar), latches, or other suitable coupling devices.

One or more fluid outlets 114 are disposed on or about the housing 102. At times, at least a portion of these one or more fluid outlets 114 may be disposed in, on, or about the displaceable portion 170 of housing 102. The one or more fluid outlets 114 permit the cooking oil in the interior portion 104 of the housing 102 to return to the reservoir containing the used cooking oil 150.

Filter media 116 is disposed within the interior space 104 of the housing 102. In some implementations, such as that depicted in FIGS. 1A and 1B, the filter media 116 is disposed proximate the hinged portion 170 of the housing 102 and adjacent to the one or more fluid outlets 114. When positioned in such a location, the filter media 116 removes at least some of the one or more contaminants from the used cooking oil 150 as the cooking oil flows from the interior portion 104 of the housing 102 and returns to the reservoir 152 as cooking oil including the one or more contaminants at a second contaminant level that is lower than the first contaminant level.

In FIG. 1B, the interior space 104 of the housing 102 is at a second pressure level $P_2$ that is greater than the first pressure level $P_1$. Arrow 120 indicates the used cooking oil level in the interior space 104 of the housing 102 tends to decrease (i.e., fall) when the gas pressure in the interior space 104 is at the second pressure level. At the second pressure level, one or more fluid inlet valves 106 prevent, obstruct, or otherwise impede the flow of used cooking oil 150 through one or more fluid inlets 108 into the interior space 104 of the housing. Additionally, at the second pressure level, one or more gas outlet valves 110 prevent, obstruct, or otherwise impede the flow of gas in the interior space 104 of the housing 102 through the one or more gas outlets 112 to the ambient environment about the housing 102.

Gas enters the interior space 104 of the housing 102 by flowing from the gas source 130 to the one or more gas inlets 134 via fluid conduits 132 (denoted by arrow 180). As gas enters the interior space 104 of the housing 102, the gas pressure in the interior space 104 increases from the first pressure level $P_1$ to the second pressure level $P_2$. As the gas pressure in the interior space 104 increases, the used cooking oil 150 is forced from the interior space 104, through the filter media 116 and out of the housing 102 via the one or more fluid outlets 114 (denoted by arrow 182).

The housing 102 can incorporate any size, shape, or volume of interior space. At times, the size and/or shape of the housing 102 may be based at least in part on the size of the used cooking oil reservoirs in which the housing 102 is used. The housing 102 and the displaceable portion 170 are fabricated from one or more materials demonstrating sufficient corrosion and/or wear resistance to cooking oils, sufficient thermal resistance to cooking oil temperatures, and sufficient structural strength at expected operating temperatures to contain a gas at the second pressure level. In some implementations, the housing 102 and the displaceable portion 170 may be fabricated from a light or medium gauge metal, for example stainless steel, carbon steel, carbon steel alloys, aluminum, aluminum alloys, and similar.

At times, the displaceable portion 170 operably couples to the housing 102, for example using one or more hinges 172. In such instances, the displaceable portion 170 remains attached to the housing 102 regardless of whether the displaceable portion 170 is in a first (i.e., closed or operating) position or in a second (i.e., open or maintenance/ cleaning) position. At other times, the displaceable portion 170 operably couples to the housing 102 using one or more fasteners, latches, or similar attachment features. In such instances, the displaceable portion 170 remains attached to the housing 102 in the first position, but may be separable or detachable from the housing 102 in the second position. In at least one implementation, the displaceable portion 170 pivotably couples to the housing 102 via one or more hinges 172 and is securely retained in at least the first position using one or more latches, for example one or more detents on the housing surface.

Although not depicted in FIGS. 1A and 1B, at times, a gasket or similar sealing device may be disposed between the housing 102 and the displaceable portion 170. Such a gasket or sealing device may fluidly seal the displaceable portion 170 against the housing 102 thereby improving filtration system 100 performance by minimizing or even eliminating bypass of used cooking oil 150 around the filter media 116.

The filter media 116 can include any filter media type or form that is capable of physically removing, separating, capturing, or isolating the one or more contaminants from used cooking oil 150. At times, all or a portion of the filter media 116 may be disposed in the interior space 104 of the housing 102. At times, the filter media 116 may additionally or alternatively remove or separate the one or more contaminants from used cooking oil 150 via one or more chemical processes such as adsorption or absorption or by chemically converting the contaminants to one or more desired products. For example, used cooking oil 150 may contain the one or more contaminants at a first contaminant level. After passing through the filter media 116, the cooking oil may contain the one or more contaminants at a second contaminant level that is less than the first contaminant level. The filter media 116 is disposed proximate at least the one or more fluid outlets 114 such that the used cooking oil 150 exiting the interior space 104 of the housing 102 passes through a portion of the filter media 116.

In some implementations, one or more latches, restraints, or holders maintains the position of the filter media 116 proximate the one or more fluid outlets 114. In some implementations, one or more latches, restraints, or holders maintains the position of the filter media 116 proximate the displaceable portion 170 of the housing 102. Such an arrangement advantageously removes the filter media from the housing 102 when the displaceable member 170 transitions to the second position, beneficially easing the removal and replacement of the filter media 116.

The fluid inlet valve 106 can include any device, system, or combination of systems and devices that permits the entry of used cooking oil 150 through the one or more fluid inlets 108 to the interior space 104 of the housing 102 when the pressure in the housing 102 (e.g., the first pressure level) is less than the hydraulic head produced by the level of used cooling oil in the reservoir relative to the level of used cooking oil in the interior space 104 of housing 102, e.g., the second pressure level. At times, all or a portion of the fluid inlet valve 106 may be disposed in the interior space 104 of the housing 102. At times, the fluid inlet valve 106 permits the entry of used cooking oil 150 into the interior space 104 of the housing 102 when the pressure in the housing 102 is at the first pressure level. The fluid inlet valve 106 may function similar to a check valve in that fluid flow (i.e., the flow of used cooking oil 150) is permitted when the downstream (i.e., interior space 104) pressure is less than a defined threshold (i.e., less than the second pressure level). Similarly, fluid flow is prohibited or reduced when the downstream (i.e., interior space 104) pressure is at or above a defined threshold (i.e., between the first and second pressure levels or at the second pressure level). In some instances, the fluid inlet valve 106 may include a metal member that lifts away from the one or more fluid inlets 108 at the first pressure level and seats against and blocks the one or more fluid inlets at the second pressure level. In some implementations, the fluid inlet valve 106 may include a gas actuated or gas actuatable device that is normally open, but closes when the gas source 130 supplies gas to the interior space 104 of the housing 102.

The gas outlet valve 110 can include any device, system, or combination of systems and devices that permit gas in the interior space 104 of the housing 102 to escape to the ambient environment about the cooking oil filtration system 100. At times, all or a portion of the gas outlet valve 110 may be disposed in the interior space 104 of the housing 102. At other times, all or a portion of the gas outlet valve 110 may be disposed remote from the housing 102, for example fluidly coupled to fluid conduit 132. At times, the gas outlet valve 110 permits the escape of gas from the interior space 104 of the housing 102 when the gas pressure in the interior space 104 of the housing 102 is at or below a defined level, for example when the pressure in the interior space 104 is at the first pressure level or when the pressure in the interior space is below the second pressure level. The gas outlet valve 110 may be a pilot or remotely operated or actuated device that alternatively, either on a cyclic or intermittent basis, closes the gas outlet valve 110 (to increase the gas pressure in the interior space to the second pressure level) and opens the gas outlet valve (to reduce the gas pressure in the interior space to the first pressure level). By cycling between the first pressure level and the second pressure level, used cooking oil 150 is cyclically drawn into the interior space 104 (first pressure level) and expelled from the interior space 104 through the filter media 116 (second pressure level).

The gas source 130 can include one or more sources of a gas at a pressure greater than atmospheric pressure (i.e., greater than 101 kPa or 14.7 psia). The gas source 130 can include a gas compressor or similar pump capable of delivering a compressed gas to the interior space 104 via the one or more fluid conduits 132. The gas source 130 may, in addition to supplying a compressed gas to the interior space 104 of the housing 102, function as a vacuum device to remove or otherwise withdraw at least a portion of the gas from the interior space 104 of the housing 102. The gas source may also include one or more compressed gas reservoirs, for example one or more compressed gas bottles or cylinders. The gas source 130 can supply gas at the first pressure level of about 0 psig; about 1 psig; about 2 psig; about 3 psig; or about 5 psig. The gas source can supply the gas to the interior space 104 at the second pressure level of about 3 psig; about 5 psig; about 7 psig; about 10 psig; or about 15 psig or greater.

Any gas may be supplied to the interior space 104 of the housing 102 to increase the gas pressure in the interior space from the first pressure level to the second pressure level. Preferred gases include those that are non-reactive with cooking oil and those that are minimally absorbed by the used cooking oil. In some instances, air may be used to provide at least a portion of the gas. In some instances, one or more compounds or components may be introduced to the gas supplied to the interior space 104. Such compounds or components may provide one or more beneficial effects that improve the quality of the used cooking oil or extend the service life (e.g., replacement interval) of the used cooking oil.

FIGS. 2A and 2B show an illustrative used cooking oil filtration system 200 that includes a partition member 210 disposed within at least a portion of the interior space 104 of the housing 102, according to one illustrated embodiment. FIG. 2A shows the illustrative used cooking oil filtration system 200 with the displaceable portion 170 in a first, or operating, position. FIG. 2B shows the same illustrative used cooking oil filtration system 200 with the displaceable portion 170 pivoted about hinge 172 through an arc 204 to a second, or maintenance/cleaning position.

The partition member 210 apportions at least some of the interior space 104 of the housing 102. The partition member 210 advantageously assists in preventing the incoming used cooking oil 150 from stirring and/or suspending any accumulated solids 202 proximate the filter media 116. At times, the partition member 210 may extend laterally across the entire width of the filter media 116. At other times, the partition member 210 may extend only across a region proximate the one or more fluid inlets 108. At times, the partition member 210 may be coupled to the portion of the housing 102 through which the one or more fluid inlets 108 are disposed (for example, the "bottom" of housing 102 depicted in FIGS. 2A and 2B). At other times, the partition member 210 may be coupled to one or more other portions of the housing 102 in addition to the portion of the housing 102 through which the one or more fluid inlets 108 are disposed (for example, the "bottom" and the "left sidewall" of housing 102 depicted in FIGS. 2A and 2B).

In addition to minimizing the stirring and/or suspending accumulated solids 202, the partition member 210 also beneficially assists in removal of any accumulated solids 202 (e.g., carbonized food particles) from the interior space 104 of the housing 102. When the displaceable portion 170 of housing 102 pivots through arc 204 about hinge 172, the accumulated solids 202 are readily accessible through an open portion 206 of housing 102. In some instances, the displaceable portion 170 can rotate through an arc 204 of about 45° or less, about 90° or less; about 135° or less; or about 180° or less. In some instances, the displaceable portion 170 may be pivotably attached to the housing 102 via a number of hinges 172, for example one hinge positioned at each end of the displaceable portion 170. In some instances, the displaceable portion 170 may be pivotably attached to the housing 102 via a single hinge, for example a piano hinge extending along an edge of the displaceable portion 170. Additionally, although shown hinged along a "bottom" edge, the displaceable portion 170 may be hinged along any edge, including a left side edge, a right side edge, or a top edge. Additionally, although shown as including only a portion of one sidewall of the housing 102, the displaceable portion 170 may include at least one entire sidewall of the housing 102 (e.g., the housing 102 may be attached similar to a lunch-box or steamer trunk where an entire wall of the structure is displaceable). Further, although the displaceable portion 170 is shown attached to the housing 102, at times, a number of fasteners may be used, which when removed, permit the detachment of the displaceable portion 170 from the housing 102.

Figure 3B:
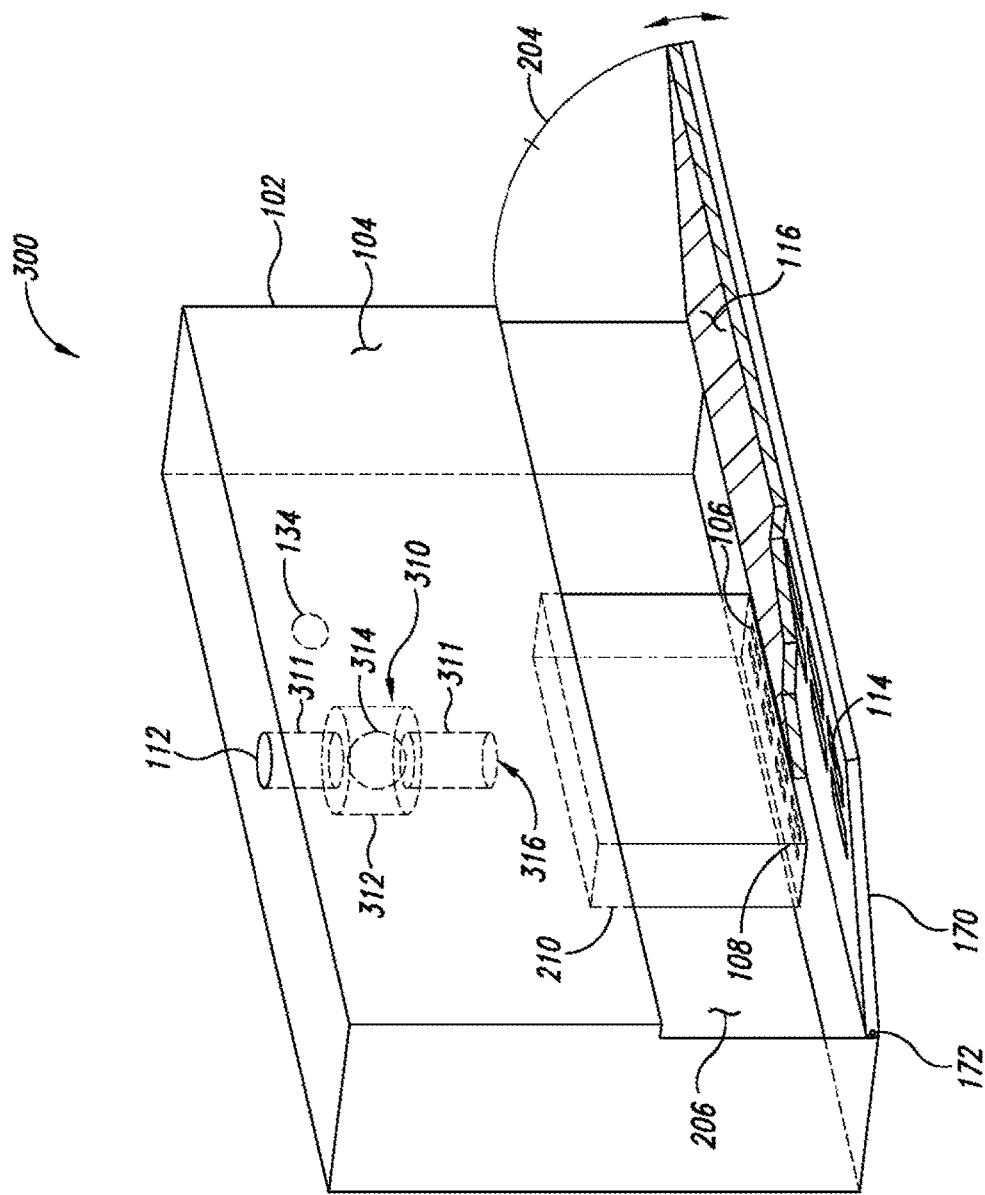
FIG. 3B is a perspective view of an example cooking oil filtration system that includes a hinged housing portion, with the hinged portion of the housing in a second, or open, position (i.e., a maintenance or cleaning position) that exposes a portion of the internal structure of the cooking oil filtration system, according to one non-limiting illustrated embodiment.

FIGS. 3A and 3B show an illustrative used cooking oil filtration system 300 having a housing 102 that includes a displaceable portion 170 and an partition member 210 surrounding the fluid inlets 108 and the fluid valve 106, according to one illustrated embodiment. FIG. 3A shows the illustrative cooking oil filtration system 300 with the displaceable portion 170 of the housing 102 in a first (i.e., operating) position. FIG. 3B shows the illustrative cooking oil filtration system 300 with the displaceable portion 170 of the housing 102 in a second (i.e., service/maintenance) position. The three-sided partition member 210 surrounding the one or more fluid inlets 108 and the fluid valve 106 is disposed within the interior space 104 of the housing 102.

Also visible in FIGS. 3A and 3B is an example gas outlet valve 310. The gas outlet valve 310 includes a fluid conduit 311 having a first diameter. The fluid conduit 311 projects into the interior space 104 of the housing 102 a fixed distance. An enlarged section of fluid conduit 312 contains a float member 314 which may be a solid sphere, ovoid, or other shape. The density of the float member 314 is less than the density of cooking oil, therefore the float member 314 will "float" on the surface of the used cooking oil 150 that enters the enlarged fluid conduit 312 via fluid conduit 311.

In operation, gas outlet valve 310 permits the flow of gas from the interior space 104 of the housing 102 while the surface of the used cooking oil 150 remains beneath an entrance 316 of the fluid conduit 311. Thus, the interior space 104 may be maintained at the first pressure level while the surface of the cooking oil remains below the entrance 316. However, when the surface of the used cooking oil 150 rises above entrance 316 the gas can no longer escape from the interior space 104 of the housing 102. In such an instance, the pressure in the interior space 104 of the housing 102 can increase to the second pressure level where at least a portion of the used cooking oil 150 flows through filter media 116 and exits the interior space 104 of housing 102, gradually lowering the surface of the used cooking oil 150 in the interior space 104 of housing 102. When the surface of the used cooking oil 150 falls beneath the entrance 316, the pressure in the interior space 104 of housing 102 drops back to the first pressure level and the cycle repeats.

FIG. 4 shows another illustrative cooking oil filtration system 400 in which a flexible diaphragm member 402 equally or unequally apportions the interior space 104 of housing 102 into a variable first volume 404 and a variable second volume 406, according to one illustrated embodiment. The gas source 130, gas inlet 134, gas outlet valve 110, and the gas outlet 112 are fluidly coupled to the first volume 404. The first volume 404 thus may be considered the "dry" side of the diaphragm member 402 since used cooking oil 150 does not enter the first volume 404. The fluid inlet valve 106, fluid inlet 108, one or more fluid outlets 114, and filter media 116 are fluidly coupled to the second volume 406. The second volume 406 thus may be considered the "wet" side of the diaphragm member 402 since gas does not enter the second volume 406.

At least a portion of a perimeter of the diaphragm member 402 is flexibly coupled to the surfaces of the housing 102 defining the interior space 104. In some implementations, the flexible coupling may include corrugated flexible sections 410 that permit the flexure of the diaphragm member 402 along at least one axis (e.g., the axis denote by arrow 420). In other instances, the flexible coupling 410 may permit the flexure of the diaphragm member 402 along a number of axes.

In operation, varying the air pressure in the first volume 404 causes the diaphragm member 402 to flex. Building pressure in the first volume 404 from the first pressure level to the second pressure level causes the first volume to increase in capacity and the second volume to decrease in capacity. As the second volume 406 decreases in capacity the used cooking oil 150 in the second volume 406 is pushed through the filter media 116 and exits the interior space 104 of the housing 102. Conversely, releasing pressure from the first volume 404 from the second pressure level to the first pressure level causes the first volume 404 to decrease in capacity and the second volume 406 to increase in capacity. As the second volume 406 increases in capacity the used cooking oil 150 in the used cooking oil reservoir 152 is drawn through the one or more fluid inlets 108 and the fluid inlet valve 106 into the second volume 406. Repeated cyclical flexing of the diaphragm member 402 thus serves to draw used cooking oil 150 into the second volume 406 (when gas pressure is at the first pressure level in the first volume 404) and pushed used cooking oil through the filter media 116 and out through the one or more fluid outlets 114 (when gas pressure is at the second pressure level in the first volume 404).

FIG. 5 shows another illustrative cooking oil filtration system 500 in which the housing 102 is positioned horizontally and immersed in the used cooking oil reservoir 152, according to one illustrated embodiment. In the embodiment shown in FIG. 5, the partition member 210 is positioned to create a gas filled chamber 502 when the housing 102 is positioned in the used cooking oil reservoir 152.

In operation, the gas source 130 provides gas to the gas-filled chamber 502 to increase the gas pressure in chamber 502 from the first pressure level to the second pressure level. Increasing the gas pressure in the gas-filled chamber 502 causes the fluid inlet valve 106 to close and pushes the used cooking oil 150 in the interior space 104 of the housing 102 through the filter media 116 and out the one or more fluid outlets 114.

Gas pressure in the gas-filled chamber 502 is reduced by bleeding gas from the chamber via the gas outlet valve 110 that may be fluidly coupled to the fluid conduit 132 so that the gas exiting the gas-filled chamber 502 does not bubble through and splash the used cooking oil 150 in reservoir 152. As the gas pressure in the gas-filled chamber 502 is reduced from the second pressure level to the first pressure level, the fluid inlet valve 106 opens, permitting used cooking oil 150 to flow through the one or more fluid inlets 108 and into the interior space 104 of the housing 102.

Figure 6:
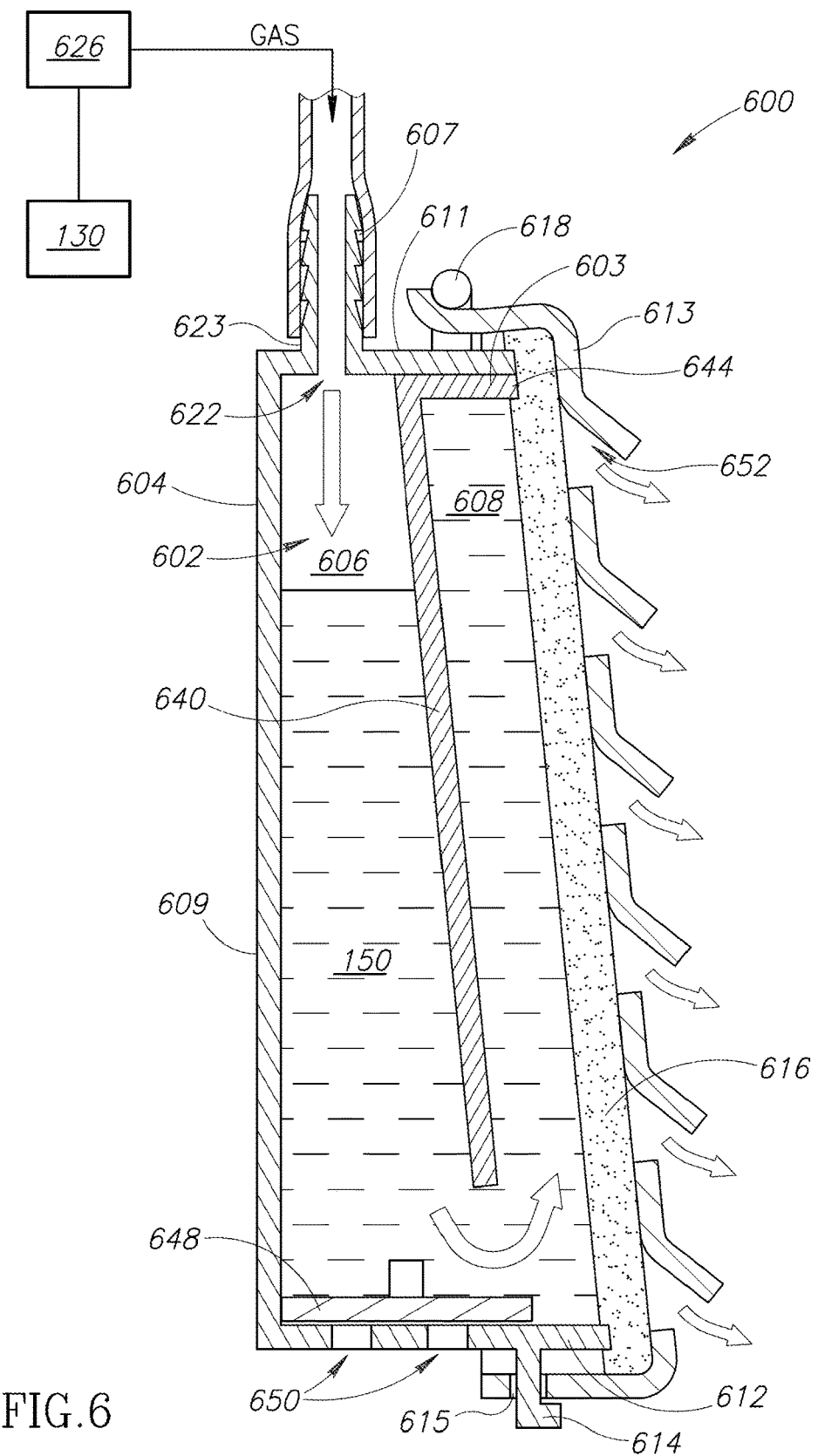
FIG. 6 is a sectional elevation view of another example cooking oil filtration system that includes a partition member, according to one non-limiting illustrated embodiment.
Figure 7:
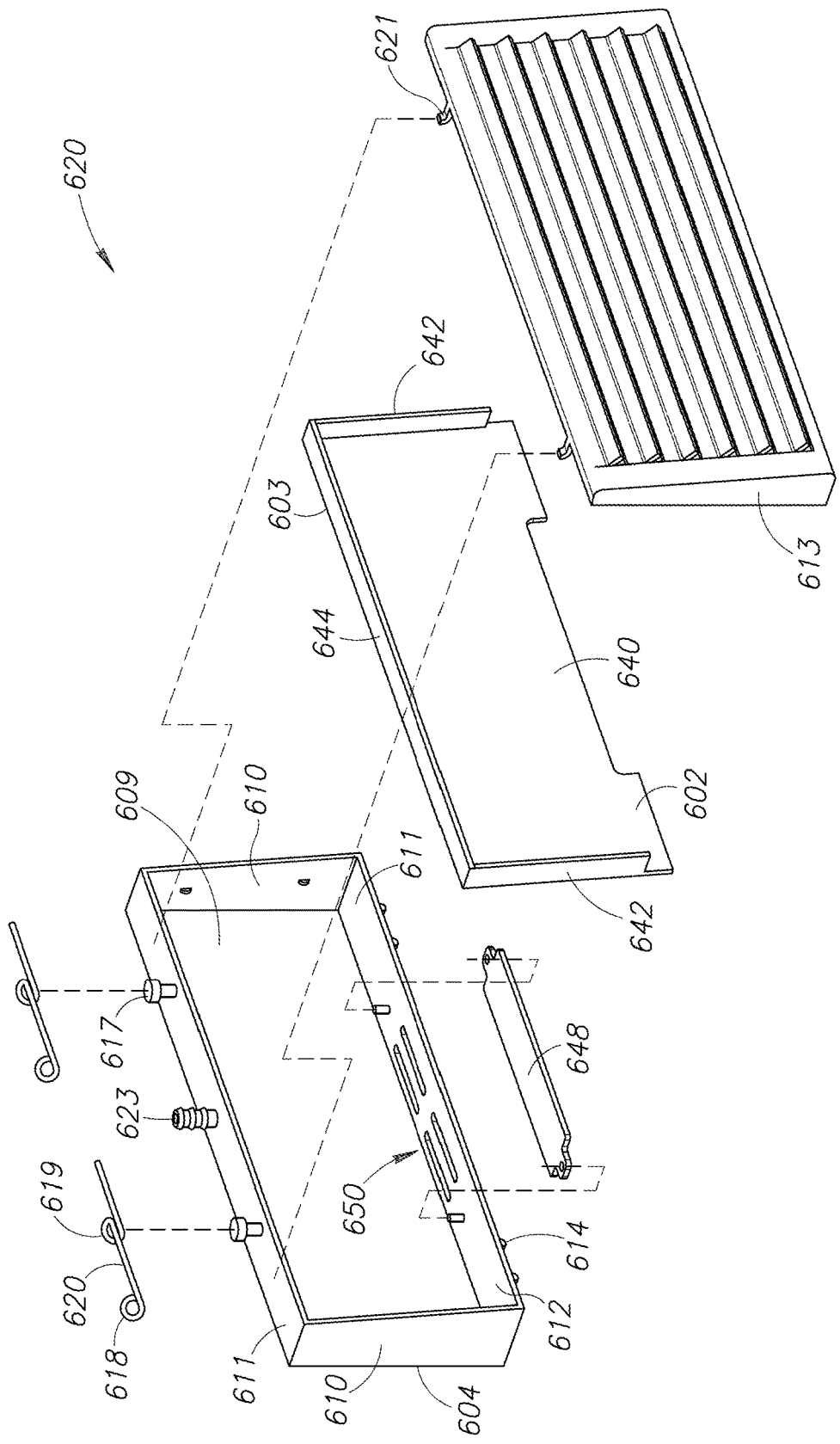
FIG. 7 is an exploded perspective view of the example cooking oil filtration system of FIG. 6.

FIGS. 6 and 7 illustrate another example cooking oil filtration system 600 in which a partition member 603 equally or unequally apportions a portion of an interior space 602 of a housing 604 into a variable first volume 606 and a variable second volume 608, according to one illustrated embodiment. The housing 604 includes a rear member 609 and side members 610, an upper member 611, and a lower member 612 that extend outwardly from the rear member 609 to form a periphery around the rear member 609. The rear, side, upper, and lower members 609, 610, 611, 612 collectively together with a displaceable member 613 define the interior space 602 of the housing 604. The housing 604 is hingedly coupled to the displaceable member 613. In particular, the housing 604 includes a plurality of hinge tabs 614 protruding from the lower member 612. The hinge tabs 614 are hingedly coupled to corresponding receiving apertures 615 disposed on or about the displaceable member 613. In the illustrated example, the receiving apertures 615 are located on a lower member of displaceable member 613. In this manner, the displaceable member 613 pivotably couples to the housing 604 to move between an open position and a closed position.

The cooking oil filtration system 600 also includes a filter media 616 disposed within the interior space 602 of the housing 604. The filter media 616 is disposed proximate the displaceable member 613. As discussed above, when positioned in such a location, the filter media 616 removes at least some of the one or more contaminants from the used cooking oil 150 as the cooking oil flows from the housing 604 and returns to a reservoir, e.g., reservoir 152 in FIG. 5, at a second contaminant level that is lower than a first contaminant level.

When the displaceable member 613 is in the closed position, as illustrated in FIG. 6, connecting tabs 621 disposed on or about the displaceable member 613 are coupleably received in the housing 604. In particular, when the displaceable member 613 is pivotably rotated to the closed position, an outer surface of the upper member 611 of the housing 604 interfaces with an inner surface of the displaceable member 613. The cooking filtration system 600 further includes one of more closure springs 618 that include a center portion 619, which is coupleably received on corresponding protrusions 617 disposed on or about the upper member 611 of the housing. An end portion 620 of the closure springs 618 is at least partially surrounded by the connecting tabs 621 of the displaceable member 613 to couple the displaceable member 613 to the housing 604.

As discussed above, the cooking oil filtration system 600 can include one or more gas inlets and outlets. For example, in the embodiment of the cooking oil filtration system 600 illustrated in FIGS. 6 and 7, the cooking oil filtration system 600 includes an opening 622 disposed on the upper member 611 of the housing 604. The opening 622 can, in some implementations, function both as a gas inlet and a gas outlet.

Figure 8A:
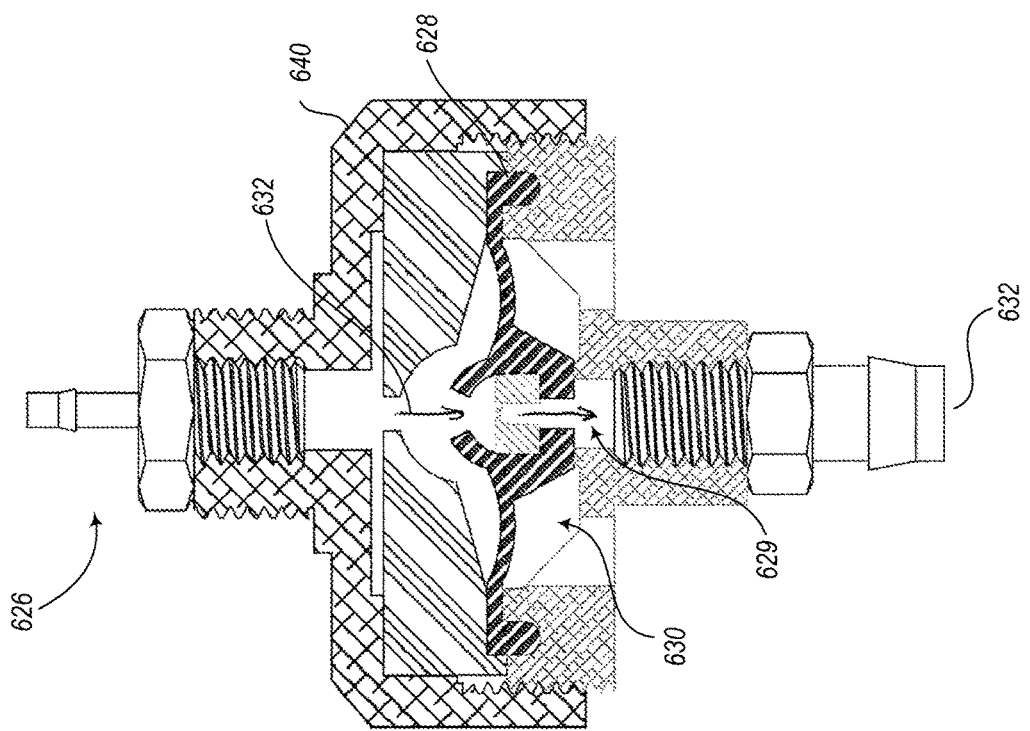
FIG. 8A is a sectional elevation view of an example gas valve in a closed position, according to one non-limiting illustrated embodiment.
Figure 8B:
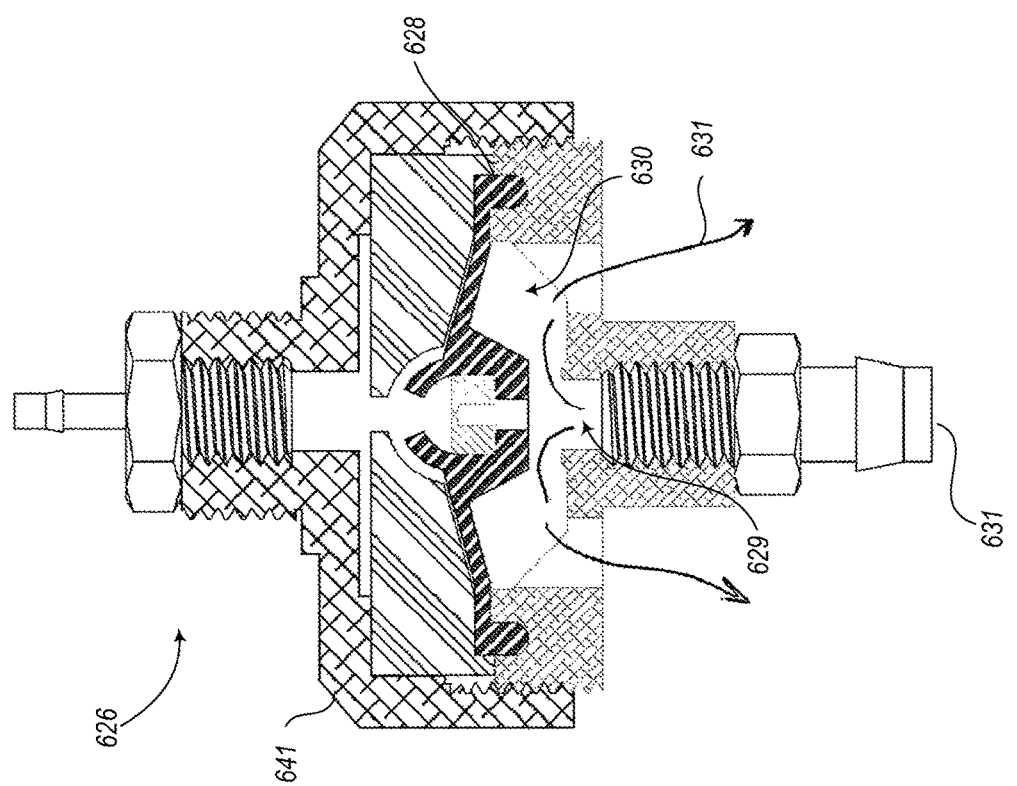
FIG. 8B is a sectional elevation view of the example gas valve of FIG. 8A in an open position, according to one non-limiting illustrated embodiment.

Gas enters the interior space 602 of the housing 604 by flowing from a gas source 130 to the one or more gas inlets via a fitting 623 that is coupled to the housing 604 through the opening 622. The fitting 623 fluidly couples the interior space 602 of the housing 604 to the gas source 130. The gas source 130 intermittently supplies a flow of gas to the interior space 602 of the housing 604, where a gas valve controls the gas pressure within the housing 604. The gas valve is configured to selectively close to reduce gas pressure by bleeding gas from the interior space 602 of the housing 604 and open to increase gas pressure in the interior space 602 of the housing 604. For example, FIGS. 8A and 8B illustrate one example embodiment of a gas valve 626 that may include a diaphragm 628 disposed within a body 641 of the gas valve 626. The diaphragm 628 can be positioned in a chamber 630 which includes a gas valve opening 629 that fluidly couples the gas valve 626 to the opening 622 of the housing 604. Thus, when the gas valve 626 is in a closed position (FIG. 8A), the diaphragm 628 prevents gas from the gas source 130 from entering the interior space 602 of the housing 604 and gas from the interior space 602 of the housing 604 exits through the opening 622 of the housing 604, i.e., gas outlet, to the chamber 630 of the gas valve 626 and is bled to the environment, as indicated by arrows denoted by numeral 631. In contrast, when the gas valve 626 is an open position (FIG. 8B), the diaphragm 628 flexes to provide access to the supply of gas to enter the interior space 602 of the housing 604 through the opening 622 of the housing 604, i.e., gas inlet, as indicated by arrows denoted by numeral 632.

As discussed above, the cooking filtration system 600 includes the partition member 603 which is disposed within the interior space 602 of the housing 604 to equally or unequally apportion a portion of the interior space 602 of the housing 604 into the variable first volume 606 and the variable second volume 608. The partition member 603 includes a dividing member 640, and partition side members 642, and a partition upper member 644 protruding from the dividing member 640. The partition upper member 644 is configured to interface with the upper member 611 of the housing 604 and the partition side members 642 are configured to interface with the side members 610 of the housing 604. The dividing member 640 is spaced apart from the rear member 609 of the housing 604 to define the first and second volumes 606, 608 of the interior space 602 of the housing 604.

The housing 604 also includes one or more fluid inlet valves that permit the entry of used cooking oil 150 through one or more fluid inlets to the interior space 602 of the housing 604. For example, in the embodiment of the cooking oil filtration system 600 illustrated in FIGS. 6 and 7, the housing 604 includes a fluid inlet valve 648 disposed in the interior space 602 of the housing 604 which prevents, obstructs, or otherwise impedes the flow of used cooking oil 150 through one or more fluid inlets. For example, the embodiment of the cooking oil filtration system 600 illustrated in FIGS. 6 and 7 includes a plurality of fluid inlets 650 disposed in the lower member 612 of the housing 604.

In operation, varying the air pressure in the interior space 602 of the housing 604 through the gas valve, e.g., gas valve 626, causes the used cooking oil 150 to be pushed through the filter media 616 and exit the housing 604. In particular, building pressure in the first volume 606 from the first pressure level to the second pressure level causes the first volume 606 to decrease in capacity and the second volume 608 to increase in capacity as the used cooking oil 150 is moved to the second volume 608 toward the filter media 616. As the second volume 608 increases in capacity, the used cooking oil 150 in the second volume 608 is pushed through the filter media 616 and exits the housing 604 through a plurality of fluid outlets 652 provided in the displaceable member 613. Conversely, releasing pressure from the first volume 606, from the second pressure level to the first pressure level, causes the second volume 608 to decrease in capacity and the first volume 606 to increase in capacity as the used cooking oil 150 is drawn through the one or more fluid inlets 650 and the fluid inlet valve 648 into the first volume 606. By cycling between the first pressure level and the second pressure level, used cooking oil 150 is cyclically drawn into the interior space 602 and expelled from the interior space 602 through the filter media 616 through the one or more fluid outlets 652.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

U.S. patent application Ser. No. 62/052,992 filed Sep. 19, 2014 is incorporated herein by reference, in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A filter system, comprising:
   a housing defining an interior space;
   at least one gas source fluidly coupled to the interior space of the housing that, in operation, intermittently introduces a gas to the interior space of the housing to increase a pressure in the interior space of the housing from a first pressure level to a second pressure level, the second pressure level higher than the first pressure level;
   at least one gas outlet;
   at least one gas flow valve fluidly coupled to the at least one gas outlet;
   at least one fluid inlet;
   at least one fluid outlet;
   at least one filter element fluidly coupled to the at least one fluid outlet; and
   at least one fluid flow valve fluidly coupled to the at least one fluid inlet that:
      in operation at the first pressure level, permits a fluid containing one or more contaminants at a first contaminant level to flow from an exterior space about the housing to at least a portion of the interior space of the housing; and
      in operation at the second pressure level, prevents the fluid containing the one or more contaminants at the first contaminant level from flowing into the interior space of the housing and promotes flow of the fluid containing the one or more contaminants at the first contaminant level within the interior space of the housing through at least a portion of the at least one filter element and the at least one fluid outlet.

2. The filter system of claim 1, further comprising:
   a partition member disposed within the interior space of the housing, the partition positioned between the at least one fluid inlet and the at least one fluid outlet.

3. The filter system of claim 2 wherein the partition member is disposed within the interior space of the housing in a location that prevents a direct fluid flow path between the at least one fluid inlet and the at least one fluid outlet.

4. The filter system of claim 1, further comprising:
   at least one flexible diaphragm member disposed in the interior space of the housing, the at least one flexible diaphragm member partitioning the interior space of the housing into two, fluidly isolated, variable capacity, chambers.

5. The filter system of claim 4 wherein the two, fluidly-isolated, variable capacity chambers include a first, gas-side, chamber and a second, fluid-side, chamber;
   wherein the compressed gas source and the at least one gas outlet are fluidly coupled to the first, gas-side, chamber; and
   wherein the at least one fluid inlet, the at least one fluid filter element, and the at least one fluid outlet are fluidly coupled to the second, fluid-side, chamber.

6. The filter system of claim 1 wherein the housing comprises a displaceable portion that includes the at least one fluid filter element positioned proximate at least one fluid outlet;
   wherein the displaceable portion is continuously displaceable between a first position and a second position; and wherein, in the first position, the displaceable portion forms a seal with the housing such that, in operation at the second pressure level, the fluid containing the one or more contaminants at the first contaminant level within the interior space of the housing flows through at least a portion of the fluid filter element and exits the interior space of the housing to the exterior space about the housing via the at least one fluid outlet.

7. The filter system of claim 6 wherein, in the second position, the displaceable portion provides direct access to the interior space of the housing.

8. The filter system of claim 6, further comprising a retainer that maintains the displaceable portion in the first position.

9. The filter system of claim 6, wherein the retainer includes at least one protrusion on the displaceable portion and a detent in a location corresponding to the at least one protrusion when the hinged member is in the first position.

10. The filter system of claim 1 wherein the at least one gas outlet is disposed remote from the housing and is fluidly coupled to the interior space of the housing via one or more hollow fluid conduits.

11. The filter system of claim 1 wherein the at least one filter element comprises a carbonaceous material.

12. The filter system of claim 1 wherein the compressed gas source comprises an air compressor.

13. The filter system of claim 1 wherein the compressed gas source comprises an air pump.

14. The filter system of claim 1 wherein the at least one filter element comprises a carbon-containing material that physically removes at least a portion of the one or more contaminants.

15. The filter system of claim 1 wherein the at least one filter element comprises one or more compounds that chemically alter the composition of at least some of the one or more contaminants.

16. An in-situ method of removing at least a portion of one or more contaminants from a used cooking oil that includes one or more contaminants at a first contaminant level to provide a cooking oil that includes the one or more contaminants at a second contaminant level lower than the first contaminant level, the method comprising:
  intermittently increasing a gas pressure in an interior space of a housing disposed in an environment including a volume of the used cooking oil that includes the at least one contaminant at the first contaminant level, from a first pressure level to a second pressure level;
  closing a fluid flow valve proximate a fluid inlet to the interior space of the housing as the gas pressure increases from the first pressure level to the second pressure level, the closed fluid flow valve to obstruct a fluid flow path from the environment to the interior space of the housing;
  flowing the used cooking oil in the interior space of the housing through a filter element fluidly coupled to a fluid outlet as the gas pressure increases from the first pressure level to the second pressure level, to provide the cooking oil containing the one or more contaminants at the second contaminant level;
  expelling the cooking oil to the environment via the fluid outlet as the gas pressure increases from the first pressure level to the second pressure level;
  intermittently decreasing the gas pressure in the interior space of the housing from the second pressure level to the first pressure level;
    opening the fluid flow valve as the gas pressure decreases from the second pressure level to the first pressure level, the open fluid flow valve to clear the fluid flow path from the environment to the interior space of the housing; and
    flowing the used cooking oil from the ambient environment to the interior space of the housing via the flow path as the gas pressure decreases from the second pressure level to the first pressure level.

17. The method of claim 16 wherein intermittently increasing a gas pressure in an interior space of a housing from a first pressure level to a second pressure level comprises:
  selectively introducing a gas from a gas source fluidly coupled to the interior space of the housing via a gas inlet disposed on the housing; and
  selectively preventing the escape of the gas from the interior space of the housing via a gas valve fluidly coupled to the housing.

18. The method of claim 17 wherein intermittently decreasing the gas pressure in an interior space of the housing from the second pressure level to the first pressure level comprises:
  selectively releasing the gas from the interior space of the housing via the gas valve fluidly coupled to the housing.

19. The method of claim 17 wherein intermittently decreasing the gas pressure in an interior space of the housing from the second pressure level to the first pressure level comprises:
  selectively fluidly isolating the gas source from the interior space of the housing.

20. The method of claim 17 wherein selectively fluidly isolating the gas source from the interior space of the housing comprises:
  selectively depowering at least one of an air compressor or an air pump fluidly coupled to the interior space of the housing.

21. The method of claim 17 wherein flowing the used cooking oil in the interior space of the housing through a filter element fluidly coupled to a fluid outlet and expelling the cooking oil via the fluid outlet comprises:
  selectively introducing a gas to a first chamber disposed within at least a portion of the interior space of the housing, the first chamber separated from a second chamber containing the used cooking oil by a flexible diaphragm; and
  responsive to the introduction of the gas to the first chamber, increasing the gas pressure in the first chamber from the first pressure level to the second pressure level to increase an internal volume of the first chamber and decrease an internal volume of the second chamber.

22. The method of claim 21 wherein flowing, at the first pressure level, the used cooking oil from the ambient environment to the interior space of the housing comprises:
  selectively releasing the gas from the first chamber; and
  responsive to the release of gas from the first chamber, reducing the gas pressure in the first chamber from the second pressure level to the first pressure level to decrease the internal volume of the first chamber and increase the internal volume of the second chamber.

23. A filter system, comprising:
  a housing defining an interior space;
  at least one gas source fluidly coupled to the interior space of the housing that, in operation, intermittently introduces a gas to the interior space of the housing to increase a pressure in the interior space of the housing from a first pressure level to a second pressure level, the second pressure level higher than the first pressure level;

at least one gas outlet;

at least one gas flow valve fluidly coupled to the at least one gas outlet;

at least one fluid inlet;

at least one fluid outlet;

at least one filter element fluidly coupled to the at least one fluid outlet;

at least one flexible diaphragm member disposed in the interior space of the housing, the at least one flexible diaphragm member partitioning the interior space of the housing into two, fluidly isolated, variable capacity, chambers; and at least one fluid flow valve fluidly coupled to the at least one fluid inlet that:
- in operation at the first pressure level, permits a fluid containing one or more contaminants at a first contaminant level to flow from an exterior space about the housing to at least a portion of the interior space of the housing; and
- in operation at the second pressure level, prevents the fluid containing the one or more contaminants at the first contaminant level from flowing into the interior space of the housing, and promotes flow of the fluid containing the one or more contaminants at the first contaminant level within the interior space of the housing through at least a portion of the at least one filter element and the at least one fluid outlet.

24. A filter system, comprising:

a housing defining an interior space;

at least one gas source fluidly coupled to the interior space of the housing that, in operation, intermittently introduces a gas to the interior space of the housing to increase a pressure in the interior space of the housing from a first pressure level to a second pressure level, the second pressure level higher than the first pressure level;

at least one gas outlet;

at least one gas flow valve fluidly coupled to the at least one gas outlet;

at least one fluid inlet;

at least one fluid outlet;

at least one filter element fluidly coupled to the at least one fluid outlet;

at least one fluid flow valve fluidly coupled to the at least one fluid inlet that:
- in operation at the first pressure level, permits a fluid containing one or more contaminants at a first contaminant level to flow from an exterior space about the housing to at least a portion of the interior space of the housing; and
- in operation at the second pressure level, prevents the fluid containing the one or more contaminants at the first contaminant level from flowing into the interior space of the housing, and promotes flow of the fluid containing the one or more contaminants at the first contaminant level within the interior space of the housing through at least a portion of the at least one filter element and the at least one fluid outlet; and wherein:
- the housing comprises a displaceable portion that includes the at least one fluid filter element positioned proximate the at least one fluid outlet;
- the displaceable portion is continuously displaceable between a first position and a second position; and
- in the first position, the displaceable portion forms a seal with the housing such that, in operation at the second pressure level, the fluid containing the one or more contaminants at the first contaminant level within the interior space of the housing flows through at least a portion of the fluid filter element and exits the interior space of the housing to the exterior space about the housing via the at least one fluid outlet.

25. An in-situ method of removing at least a portion of one or more contaminants from a used cooking oil that includes one or more contaminants at a first contaminant level to provide a cooking oil that includes the one or more contaminants at a second contaminant level lower than the first contaminant level, the method comprising:

intermittently increasing a gas pressure in an interior space of a housing disposed in an environment including a volume of the used cooking oil that includes the at least one contaminant at the first contaminant level, from a first pressure level to a second pressure level by:
- selectively introducing a gas from a gas source fluidly coupled to the interior space of the housing via a gas inlet disposed on the housing; and
- selectively preventing the escape of the gas from the interior space of the housing via a gas valve fluidly coupled to the housing;

closing a fluid flow valve proximate a fluid inlet to the interior space of the housing as the gas pressure increases from the first pressure level to the second pressure level, the closed fluid flow valve to obstruct a fluid flow path from the environment to the interior space of the housing;

flowing the used cooking oil in the interior space of the housing through a filter element fluidly coupled to a fluid outlet as the gas pressure increases from the first pressure level to the second pressure level, to provide the cooking oil containing the one or more contaminants at the second contaminant level;

expelling the cooking oil to the environment via the fluid outlet as the gas pressure increases from the first pressure level to the second pressure level;

intermittently decreasing the gas pressure in the interior space of the housing from the second pressure level to the first pressure by:
- selectively fluidly isolating the gas source from the interior space of the housing via selectively depowering at least one of an air compressor or an air pump fluidly coupled to the interior space of the housing;

opening the fluid flow valve as the gas pressure decreases from the second pressure level to the first pressure level, the open fluid flow valve to clear the fluid flow path from the environment to the interior space of the housing; and flowing the used cooking oil from the ambient environment to the interior space of the housing via the flow path as the gas pressure decreases from the second pressure level to the first pressure level.

26. An in-situ method of removing at least a portion of one or more contaminants from a used cooking oil that includes one or more contaminants at a first contaminant level to provide a cooking oil that includes the one or more contaminants at a second contaminant level lower than the first contaminant level, the method comprising:

intermittently increasing a gas pressure in an interior space of a housing disposed in an environment including a volume of the used cooking oil that includes the at least one contaminant at the first contaminant level, from a first pressure level to a second pressure level by:
  selectively introducing a gas from a gas source fluidly coupled to the interior space of the housing via a gas inlet disposed on the housing; and
  selectively preventing the escape of the gas from the interior space of the housing via a gas valve fluidly coupled to the housing;
closing a fluid flow valve proximate a fluid inlet to the interior space of the housing as the gas pressure increases from the first pressure level to the second pressure level, the closed fluid flow valve to obstruct a fluid flow path from the environment to the interior space of the housing;
flowing the used cooking oil in the interior space of the housing through a filter element fluidly coupled to a fluid outlet as the gas pressure increases from the first pressure level to the second pressure level, to provide the cooking oil containing the one or more contaminants at the second contaminant level;
expelling the cooking oil to the environment via the fluid outlet as the gas pressure increases from the first pressure level to the second pressure level, wherein flowing the used cooking oil in the interior space of the housing through a filter element fluidly coupled to a fluid outlet and expelling the cooking oil via the fluid outlet comprises:
  selectively introducing a gas to a first chamber disposed within at least a portion of the interior space of the housing, the first chamber separated from a second chamber containing the used cooking oil by a flexible diaphragm; and
  responsive to the introduction of the gas to the first chamber, increasing the gas pressure in the first chamber from the first pressure level to the second pressure level to increase an internal volume of the first chamber and decrease an internal volume of the second chamber;
intermittently decreasing the gas pressure in the interior space of the housing from the second pressure level to the first pressure level;
opening the fluid flow valve as the gas pressure decreases from the second pressure level to the first pressure level, the open fluid flow valve to clear the fluid flow path from the environment to the interior space of the housing; and
flowing the used cooking oil from the ambient environment to the interior space of the housing via the flow path as the gas pressure decreases from the second pressure level to the first pressure level.

* * * * *